UNITED STATES PATENT OFFICE.

HERMAN G. SCHANCHE, OF PHILADELPHIA, PENNSYLVANIA, ASSIGNOR TO HARRISON BROS. & CO., INC., OF PHILADELPHIA, PENNSYLVANIA, A CORPORATION OF PENNSYLVANIA.

MANUFACTURE OF RESIN SOAP.

1,017,693. Specification of Letters Patent. Patented Feb. 20, 1912.

No Drawing. Application filed February 15, 1907. Serial No. 357,507.

*To all whom it may concern:*

Be it known that I, HERMAN G. SCHANCHE, of Philadelphia, in the county of Philadelphia and State of Pennsylvania, (whose present post-office address is Thirty-fifth street and Gray's Ferry road, Philadelphia, aforesaid,) have invented certain new and useful Improvements in the Manufacture of Resin Soap, whereof the following is a specification.

Resin soap, as known in the arts, is primarily a resinate of soda, usually carrying indefinite quantities of uncombined resin, or uncombined soda, or both, and ordinarily existing, or used, in aqueous solution.

The methods heretofore commercially employed for its manufacture, though different in detail, are alike in their general principle, in that the essential combination has been effected in what may be termed the "wet way"; the process varying from the crude haphazard method used in many paper mills, where the ingredients are simply boiled together, to form an aqueous solution, and used upon the spot; to the more definite processes wherein it has been attempted to prepare the resinate of soda in a more or less concentrated aqueous solution, which was intended to be subsequently reduced by the addition of water for conversion into size; or even the evaporation of such an aqueous solution until a hard residuum was obtained; the purpose of these two last mentioned processes being to manufacture the resin soap as an article of commerce, which could be shipped in a less bulky form than the ordinary "size", and converted into the latter at the paper mill, by the addition of water. When prepared in what has been above described as the "wet way", *i. e.*, by the formation of a true aqueous solution as an incident to the process of manufacture, the product exhibits great tenacity in retaining a certain amount of the water. So persistent is this retention that I believe it to have been commercially impractical to eliminate all the water without breaking up the compound itself to some extent, or at least losing some of the constituent parts.

In an application for Letters Patent of the United States, filed jointly by Franke Stuart Havens, and myself, simultaneously herewith, being Serial No. 357,506, a process for the manufacture of resin soap is set forth, the characteristic of which is that the chemical reaction, which may be termed the "saponifying" stage, instead of being effected in the "wet way", is attained either in the absence of water, or with only so much water present as shall disappear to the desired extent during the reaction itself, and the subsequent cooling of the product. The purpose and result of this process is to obtain what may be properly termed "an inherently desiccated" resin soap, of uniform chemical constitution, and in a physical condition which admits of its substantial comminution if desired.

My present invention may be advantageously employed in connection with this last mentioned process, and has for its objects the facilitation of the treatment, and the improvement of the final product.

For the description of my process and its product I will take as a typical formula, (but, of course, without restrictive effect), the following:—With one hundred (100) pounds of resin, in its natural condition, I may employ thirty-two (32) pounds of crystalline carbonate of soda, first melting the resin, and thereafter maintaining it at a temperature not greatly in excess of its melting point. The ingredients are stirred together, preferably until the saponifying reaction is about complete, and I thereupon add to the mass, while still liquefied by heat, an inert extending substance, preferably one of those which are ordinarily used for the weighting of paper such as clays, talc, agolite, or pearl finish. The extending substance is preferably added in powdered form, and for a charge made up as above, a formula, which could be advantageously followed, would be, to add thirty-five (35) pounds of clay. The proportions of the extending material, however, may be varied to any desired extent not inconsistent with the ultimate use of the product, and I therefore do not, in any way limit such proportion. After the addition, the still liquefied mass should be thoroughly stirred so as to uniformly disseminate the inert extending substance throughout it, thereby incorporating such substance as an incident to the primary manufacture, and the compound should be allowed to solidify by cooling. It may then be ground to the desired degree of fineness and shipped as a commercial article. If desirable, further amounts of such inert material may be introduced and mixed with the product thus made.

If, instead of crystalline carbonate of soda (which itself contains a percentage of water) soda-ash be used, the addition of a certain amount of water may be tolerated with advantage, provided the quantity be not such as to result in the formation of a true aqueous solution of the resin soap itself. I therefore do not wish to be understood as excluding the use of water as an incident to the process, the limitation being that the water shall only be present in such quantity as shall disappear to the desired extent, during the saponifying process and the cooling of the melted product, and without any treatment comparable to that of the evaporation of a true solution. In this instance, as in the other, I add the inert extending material, preferably at the stage above described, and incorporate it with the mass before cooling, and as an incident to the process of manufacture.

Another process for the manufacture of a desiccated resin soap, characterized by non-aqueous solution is that set forth in the application of Franke Stuart Havens, filed simultaneously herewith. My invention can be employed also in connection with said last mentioned process, the important feature in both instances being that the processes permit the incorporation of the extending material as an incident to the manufacture of a desiccated product.

Having thus described my invention, I desire to state that I, of course, do not claim in this application, any feature which is set forth and claimed in the said joint application of Franke Stuart Havens and myself, nor in the said application of Franke Stuart Havens.

My invention has peculiar value for the processes which are characterized by the avoidance of an aqueous solution of the resin soap, itself, during the saponifying process. When thus employed, the incorporation of an inert extending material, prior to the solidification of the mass, has a definite effect upon the process itself, and upon the immediate commercial product, which is wholly distinct from the mere addition of the extending material as a component of the resin size to be ultimately made by the addition of water. Its influence when thus inherently incorporated, may be described as two-fold:—(1) It tends to enhance the dessication characteristic of the saponifying process, and facilitates the grinding after solidification; and, (2) it tends to minimize the susceptibility of the commercial product to atmospheric conditions. As above stated, these properties are additional to, and wholly independent of, any ultimate effect produced in the size itself by the mere presence of inert extending material therein, and relates specifically to the production and preservation of the desiccated resin soap as an article of manufacture and commerce.

I claim:—

1. The process of manufacturing a desiccated acid resin soap, which consists in adding to an excess of melted resin, soda combined with an amount of water only sufficient to cause diffusion and to prevent undue segregation of the soda, but not sufficient to effect solution of the entire mass, and not substantially exceeding the percentage of water which is contained in dry crystalline sodium carbonate, and thereby forming an acid resin soap in an initial state of non-aqueous liquefaction, incorporating with the mass while in such initial liquefied condition an inert extending material, and causing the resultant product to solidify by cooling.

2. As a new composition of matter, an inherently desiccated acid resin soap in a state of substantial comminution throughout, not entirely soluble in water, containing free resin uniformly diffused throughout its mass, and containing an inherently incorporated inert extending material.

In testimony whereof, I have hereunto signed my name, at Philadelphia, Pennsylvania, this 13th day of February, 1907.

HERMAN G. SCHANCHE.

Witnesses:
 SAMUEL J. TAYLOR,
 JAMES H. BELL.

---

Copies of this patent may be obtained for five cents each, by addressing the "Commissioner of Patents, Washington, D. C."